(12) United States Patent
Shteyn

(10) Patent No.: US 6,918,123 B1
(45) Date of Patent: *Jul. 12, 2005

(54) CALLS IDENTIFY SCENARIO FOR CONTROL OF SOFTWARE OBJECTS VIA PROPERTY ROUTES

(75) Inventor: Yevgeniy Eugene Shteyn, Cupertino, CA (US)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

This patent is subject to a terminal disclaimer.

(21) Appl. No.: 09/165,683

(22) Filed: Oct. 2, 1998

(51) Int. Cl.[7] .............................................. G06F 9/46
(52) U.S. Cl. ........................ 719/318; 719/320; 719/328
(58) Field of Search ................................. 719/318, 320, 719/328, 310–317, 319; 709/310–320

(56) References Cited

U.S. PATENT DOCUMENTS

| | | | | |
|---|---|---|---|---|
| 5,467,264 A | * | 11/1995 | Rauch et al. | 700/12 |
| 5,713,045 A | * | 1/1998 | Berdahl | 395/893 |
| 6,108,717 A | * | 8/2000 | Kimura et al. | 710/8 |
| 6,499,062 B1 | * | 12/2002 | Shteyn | 719/315 |

FOREIGN PATENT DOCUMENTS

| | | | | |
|---|---|---|---|---|
| EP | 713178 | * | 5/1996 | G06F/9/46 |
| EP | 0 762 273 A | | 3/1997 | |
| WO | 16886 | * | 4/1998 | G06F/13/10 |

OTHER PUBLICATIONS

"Home API Specification," Aug. 1999, Draft Version 0.98, p. 5–27.*

* cited by examiner

Primary Examiner—Meng-Al T. An
Assistant Examiner—Li Zhen
(74) Attorney, Agent, or Firm—Michael J. Ure

(57) ABSTRACT

An information processing system has first and second physical components represented by a first and second software objects. Both objects have properties that are changeable through calls to the objects. The system enables registering a property route linking a first property of the first object to a second property of the second object so that a change in the first property causes the second call being issued to the second object upon invoking the property route. The input call to the first object comprises an identifier enabling to conditionally invoke the route. In this manner, routes belonging to different scenarios are being kept independent so that the system operates more reliable that without scenario identifiers.

11 Claims, 2 Drawing Sheets

CALLS IDENTIFY SCENARIO FOR CONTROL OF SOFTWARE OBJECTS VIA PROPERTY ROUTES

FIELD OF THE INVENTION

The invention relates to an information processing system and a method, in particular, but not exclusively, for control of consumer electronics equipment in the home or office environment.

BACKGROUND ART

Consider a client-server model based on Component Object Model (COM) technology of Microsoft. For more information, see, e.g., the Component Object Model Specification version 0.9 of October 1995 as supplied by Microsoft, herein incorporated by reference. COM is object-oriented. An object has properties that represent control functionalities of an associated electronic device as exposed to a software application. A state change of an object as a consequence of an event from outside is passed on to the software application. The application manipulates the objects by changing or setting their properties. When the application modifies property of an object associated with a certain physical device a command is sent to the associated device.

COM is a generic mechanism allowing applications to communicate in a consistent way and is a framework for developing and supporting program component objects. It provides capabilities similar to those defined in CORBA (Common Object Request Broker Architecture), the framework for the interoperation of distributed objects in a network. OLE (object linking and embedding) provides services for the compound document that users see on their display, COM provides the underlying services of interface negotiation and event services (putting one object into service as the result of an event that has happened to another object). In this implementation clients are modeled as OLE Automation objects (abstract representations) that use properties to expose controls and events to signal state changes. OLE Automation is a COM technology that enables scripting and late binding of clients to servers. OLE Automation provides communication with other programs through calls to features (commands and queries) that the programs have made available for external use. Before using an object, a client application has first to obtain the object's interface pointer. The interface pointer is obtained through the network's directory by binding the object's name or by enumerating devices. Standard COM API's for moniker binding can be used. References to objects can be obtained by calling GetObject or CoGetObject with a string specifying the desired device's name or ID. The application can then manipulate the object by setting or retrieving its properties through "set property" calls to the appropriate properties. When an application sets or modifies a property of an object corresponding with a device the property-setting operation or modification operation is converted into a command that is sent across the network to the relevant device. The objects may differ in implementation, but expose a similar property-based model to client applications running on a controller, e.g., a PC with a Windows-based operating system.

OBJECT OF THE INVENTION

Consider an information processing system comprising such objects (i.e., a collection of software modules as introduced above) and client software applications that control the interaction among the objects. For example, the system comprises a home automation sub-system with audio/video equipment for entertainment, a security sub-system and an inhouse-climate control sub-system. These sub-systems and their components are modeled as OLE Automation objects that use properties to expose their controls to application clients and events to signal state changes to the application clients. The sub-systems may use different communication protocols for their control signals. Accordingly, since they cannot communicate with each other directly, they communicate at the object-level. A client application could register for notification of changes to the "state" property of a first object representing a first (software) sub-system or first device and respond by setting a specific property of a second object representing a second sub-system or second: device. However, the client application would need to be running all the time to provide this interaction. An alternative solution is therefore to specify that, whenever a change occurs to a property of a first object, the property's new value be propagated as a SetProperty call to a property of a second object. This mechanism is being referred to as a property route. A property route interconnects objects and is registered at the network's directory as a system-wide OLE Automation object itself. Registering a route creates a link between properties, typically, but not necessarily, between properties of different objects. Whenever a first property changes, the change triggers a call to change a second property via the registered route interconnecting these properties.

However, this mechanism has some drawbacks. For example, a state change of an object's property may have been triggered by an influence other than by a particular client application that has registered the route involving that object's property. The state change should not cause this particular route to be invoked under this circumstance. The problem arises, for example, when multiple routes have one or more properties in common. This sharing of one or more properties among routes is especially likely in an open architecture like a home network, where devices get added or replaced at will. To illustrate the problem consider, for example, a first client application that registers a first property route, and a second application that registers a second property route. When a property (1) of an object A changes from a state "0" to a state "1" the first route gets invoked causing a property (2) of an object B to change its state from "0" to "1". The second route, however, specifies that a change of property (1) of object A from state "0" to state "1" results in a change of property (3) of an object C from state "0" to "1". If both the first route and the second route have been registered, invoking the first route will cause the system to assume a state that is neither the desired end state for the first application nor the desired end state for the second application since both object B and object C respond by changing the states of their properties. Moreover, when multiple applications register or un-register associated property routes, side effects could cause a complete system breakdown. For example, a particular application registers a specific route to provide the system with a pre-specified behavior. If another application adds a route having a source property in common with the first route but having a different destination property, or removes the first route altogether, conflicts may be the result that render the system inoperative or even self-destructive.

It is therefore an object of the invention to guarantee that the system assumes a state that is desired by the relevant application using the property route mechanism. It is another object to avoid system-breakdown as a result of registering or unregistering property routes.

SUMMARY OF THE INVENTION

To this end, the invention provides an information processing system comprising a first physical component represented by a first software object, and a second physical component represented by a second software object. The first object has at least a first property that is changeable through a first call to the first object. The second object has at least a second property that is changeable through a second call to the second object. The system enables registering a property route linking the first property to the second property so that a change in the first property causes the second call being issued to the second object upon invoking the property route. The input call to the first object has associated with it an identifier enabling to conditionally invoke the route. The identifier is, for example, a system-wide unique number or an object. The object contains, for example, a description of all routes involved and application logic to conditionally invoke certain routes.

Now, the route does not get invoked automatically merely because the source property of its source object has changed. The identifier causes the route to be invoked conditionally, i.e., if one or more pre-specified conditions are met. For example, the first object changes the first property after receiving the first call. After changing the first property, the first object initiates a look-up action for determining if any property route is associated with the change of the first property. This order of the operations is preferred, because the property may not be able to be changed or need not to be changed. If the order were reversed, calls would be forwarded to the second object without the first object's property having undergone a change, leading to inconsistencies. If there are one or more property routes found associated with the change of the first property, the system determines if there is a match between the identifier and one or more of the property routes found. If there is a match, the matching property route or routes get invoked. If there is no match to be found, the route does not get invoked. The identifier comprises for example, a reference to a scenario of operating the system. The route or routes associated with this scenario are identified with the identifier in the first call. The system may further enable a software application to register the property route, and the identifier in the call comprises a reference to the software application. Thus, only routes associated with a specific software application get invoked. The call's identifier may have both a scenario identiier and an application identifier.

Preferably, a property route comprises a reference to the software application that has registered the property route. Upon removing the application, there is no need anymore for the routes associated with the application removed. Accordingly, these routes get unregistered based on their references to the application.

The look-up action mentioned above may involve a look-up table or a graph associated with the first object. For example, the first object comprises a look-up mechanism itself or it activates a look-up functionality elsewhere in the system, such as a route manager. The route manager is the system's software object responsible for managing the property routes. The route manager accomplishes the registering and de-registering of property routes. The look-up mechanism takes into account the identifier that specifies whether it is actually desirable that the second property of the second object be changed. The identifier specifies, for example, a particular scenario of changes intended by the application that has registered the property route. As in the example given above, a change in a property (1) of object A might cause both the first and second route to be invoked if there is no scenario control. If the call identifies the scenario associated with the first route, the second route does not get invoked.

According to the invention, multiple routes that share one or more objects get executed independently and do not interfere with one another. The system can log any sequence of property changes so that it can be traced back, based on the identifiers, to a particular route and to the application which registered the route. The latter case is relevant for maintenance or debugging, for example. Further, when an application is being removed, it is not a problem to remove all routes associated with it. The routes are executed independently of each other owing to the identifiers, and routes associated with different applications do not affect one another. Owing to this independence, the system can selectively enable or disable routes based on, e.g., the system's state, time, the available resources, etc. The independence of the labeled routes also allows a software application or a software agent to enable or disable routes as devices or software modules are being plugged-in or unplugged. In a game or instructional environment, an application can enable or disable routes based on the number, skills and location of the players. In short, the independence of the routes, obtained through labeling them with identifiers, adds another degree of freedom to using an object-based information processing system.

BRIEF DESCRIPTION OF THE DRAWINGS

The invention is explained by way of example and with reference to the accompanying drawings, wherein.

REFERRED EMBODIMENTS

Figure 1:
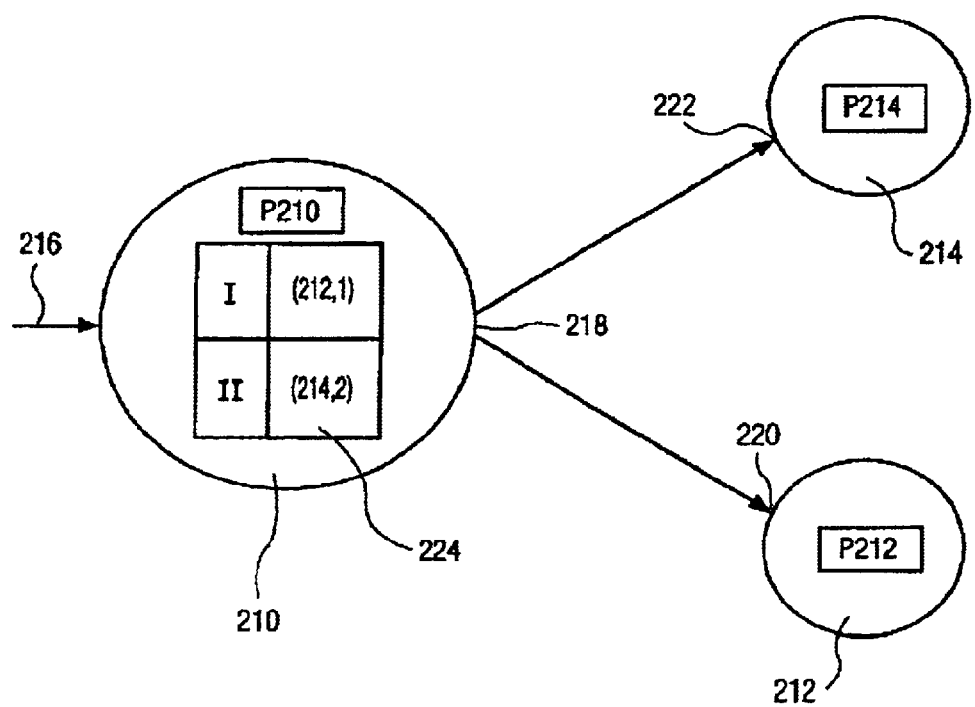
FIG. 1 is a block diagram illustrating scenario controlled property routes.

FIG. 1 is a block diagram 200 illustrating the scenario-controlled routing of property changes, according to the invention, among software objects 210, 212 and 214. Software object 210 has an input 216 an input for receiving an input call, and an output 218 for issuing an output call. Object 212 has an input 220 for receiving an input call. Object 214 has an input 222 for receiving an input call. Object 210 has multiple properties of which only a property P210 is shown in order to not obscure the drawing. Property P210 is changeable through an input call at input 216 that refers to property P210. Objects 212 and 214 have respective properties P212 and P214 that are changeable through proper input calls at inputs 220 and 222, respectively.

A first client application (not shown) has registered a first route linking property P210 to property P212 so that a change in property P210 causes object 210 to issue an output call at output 218 to object 212 for changing property P212. A second client application has registered a second route linking property P210 to property P214 so that a change in property P210 causes object 210 to issue an output call at output 218 to object 214 for changing property P214. Without further measures, a change in property P210 triggers invoking both the first route and the second route and thus a change in both properties P212 and P214. Therefore, according to the invention, the input call at input 216 of object 210 comprises an identifier for selectively controlling invoking the appropriate one of the first and the second routes that share the same source property P210. When object 210 receives the call or request at input 216, it processes the call and changes property P210 in accordance to the call. Thereupon, object 210 triggers a look-up action to determine if a route is associated with the change of property P210. Object 210 has, in this example, a look-up table 224 that identifies the routes related to the change of property P210. The result of the look-up action is that both the first and the second routes are associated with the property change. The call at input 216 comprises an identifier to determine which of the routes associated with the change of property P210 is to be invoked. If the identifier is "I" table 224 prescribes that the first route is to be invoked for changing property P212 of object 212. If the identifier is a "II", table 224 prescribes that the second route is to be invoked for changing property P214 of object 214. Changing a property before invoking the associated route is done for reasons of reliability.

Figure 2:
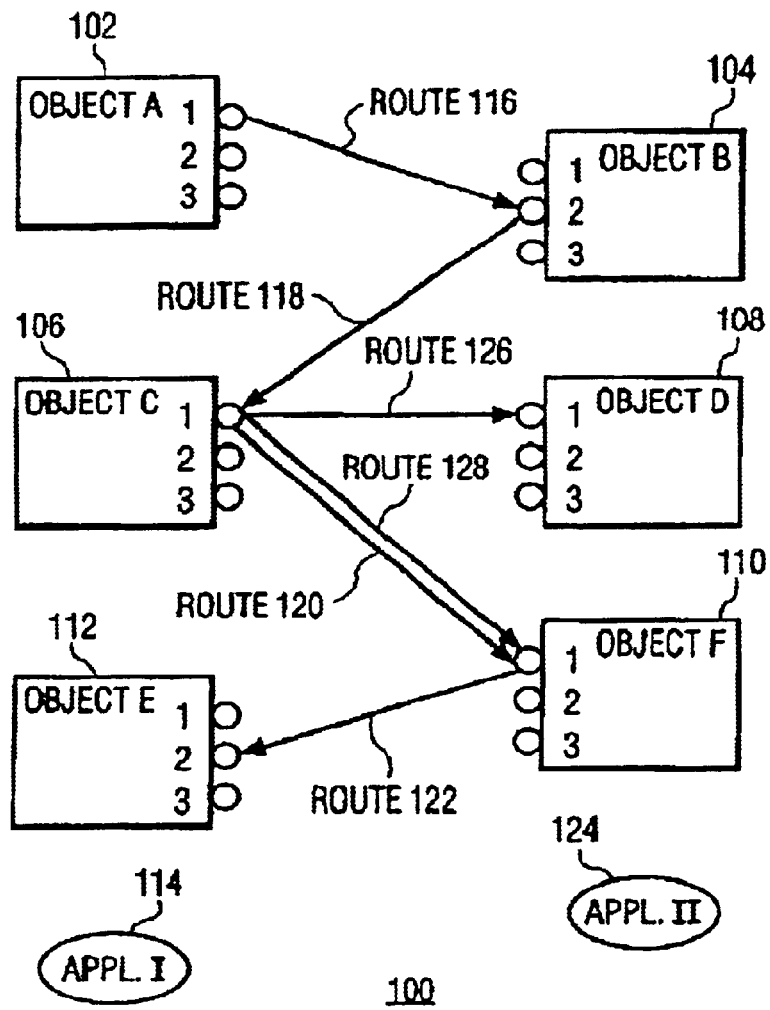
FIG. 2 is a block diagram of an object-oriented system configured with objects that have properties.

FIG. 2 is a block diagram of an example of an information processing system 100 according to the invention. System 100 comprises a plurality of software objects 102, 104, 106, 108, 110 and 112. Each of objects 102–112 represents a particular controllable device, e.g., in a home automation system. Each of objects 102–112 has one or more properties, three in this example, referred to as property 1, property 2 and property 3. A client software application 114 registers multiple routes 116, 118, 120, and 122 that interconnect objects 102, 104, 106, 110 and 112. When property 1 of object 102 has changed its state, route 116 gets invoked to change property 2 of object 104. In turn, when property 2 of object 104 has changed its state, route 118 is invoked to change property 1 of object 106. Route 120 is invoked in order to set property 1 of object 110 upon a completed state change of property 1 of object 106. Object 110 is connected to object 112 via route 122 when property 1 of object 110 has changed its state in order to change property 2 of object 112.

An example of the scenario that gets executed by invoking routes 116–122 is the following. Property 1 of object 102 represents the on/off control functionality of a DVD player (not shown). When property 1 changes state from "on" to "off" the sound system (not shown) is to be activated. Property 2 of object 104 represents the on/off control functionality of the sound system. Property 2 of object 104 gets set through route 116. When the sound system has been activated via object 104, the lights (not shown) in the room are to be dimmed to a predefined level. Object 104 therefore invokes route 118 to change property 1 of object 106. Object 106 comprises a software representation of the controller (not shown) for a lighting system (not shown) and property 1 of object 106 represents the brightness level of the lights that gets set through route 118. Controller representation 106 issues a call to the representation of the lighting system, here object 110, whose property 1 is set according to the controller's state via route 120. When the lights have been set to the predefined level object 110 invokes route 122 to change the state of object 112 that represents a telephone apparatus (not shown). Route 122 serves to disable the telephone's acoustic signal in order to avoid that the user gets interrupted when watching the DVD movie. Property 2 of object 112 represents the on/off control functionality of the telephone's acoustic signal.

Now a second software application 124 registers routes 126 and 128. Route 126 propagates a change in state of property 1 of object 106 to property 1 of object 108. Route 128 propagates a change of state of property 1 of object 106 to property 1 of object 110. In the above example, when the light controller represented by software object 106 has changed state to "lights low" or "lights off" route 128 to property 1 of object 110 is invoked that in the example above represents the lighting system. Also, a call gets issued to property 1 of object 108 that in this example represents a home security system (not shown). Setting property 1 of object 108 turns on the home security system.

Note that route 128 runs in parallel with route 120. If routes 128 and 120 did not have different labels or identifiers, a change of state in property 1 of object 106 would directly invoke routes 120, 126 and 128, and indirectly as a result route 122. This is not the user's intention in this case. Accordingly, by labeling the calls so that the objects are able to identify the associated scenario through the identifiers, route 120 on the one hand and routes 126 and 128 on the other hand, are made independent even when sharing one or more source properties of one or more source objects.

Figure 3:
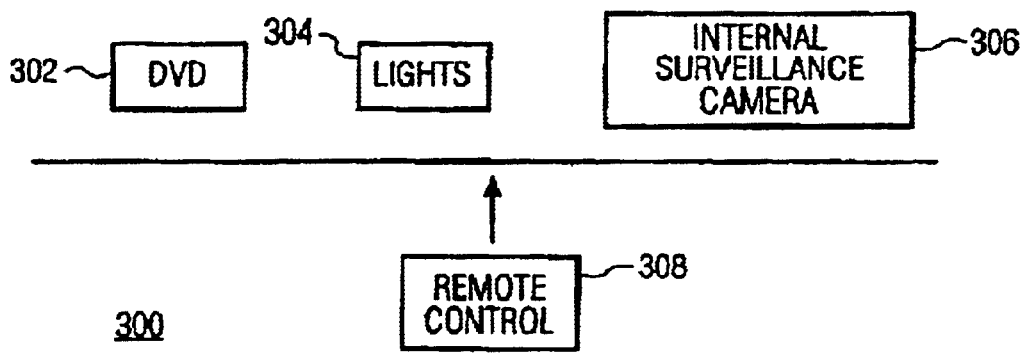
FIG. 3 is a block diagram of another object oriented system in the invention.

FIG. 3 illustrates a scenario that enables an entertainment system 300 to automatically detect user movement in order to stop a DVD player. System 300 comprises of software object 302 representing a DVD player (not shown), a software object 304 that represents a lighting system (not shown) and a software object 306 that represents a camera (not shown). Pressing a button on a remote control device 308 activates the scenario as follows. The DVD mode is changed to "Play", the brightness of the lights goes to 20%, and the camera's recognition background is set to "Dimmed" and its state is set to "Detect Change" (in the chair of the user). When the user gets up, the camera detects his/her movement through a motion detector. Upon detecting the user's movement, "Brightness" is set to 100%, the camera's recognition background is set to "Bright", and the DVD mode is set to "Stop". A similar scenario is possible when the user is watching a TV program. In this case automatic recording of a program is activated. Upon user return, the content is played from the moment where it was left. In some cases such system behavior could be considered undesirable unless activated through a scenario. For example, if user just wants to leave the current program and return later without reviewing missed content.

Above systems 100 and 300 are object-oriented and based on control of object properties. A Home Audio/Video interoperability (HAVi-) based system can similarly benefit from the route labeling approach. A brief description of HAVi is given first to provide the context for a HAVi-implementation of a system according to the invention.

A consortium of consumer electronics manufacturers, among which Philips Electronics, has been working on specifications for a core of API's (application programming interfaces) for digital consumer electronics appliances in a home network so as to provide a standard for the audio/video electronics and the multimedia industries. An API specifies the method required for making requests to an operating system or application program. The home network is considered a distributed computing platform. The primary goal of the standard, referred to as the HAVi (Home Audio/Video interoperability) architecture is to ensure that products of different vendors can interoperate, i.e., cooperate to perform application tasks. Current CE devices, such as home entertainment equipment (DVD players, DV camcorders, digital TV sets, etc.) are digital processing and digital storage systems. Connecting these devices in networks makes it possible to share processing and storage resources. This allows coordinating the control of several CE devices simultaneously, e.g., in order to simplify user-interaction. For example, a first device may instantiate recording on a second device while accessing an EPG (electronic program guide) on a third device. The home network provides the fabric for connecting the CE devices. It allows connected devices to exchange both control (one device sending a command to another) and AV (audio/video) data (one device sending an audio or video stream to another device). The network has to meet several requirements in order to achieve all this. It must support timely transfer of high-data-rate AV streams. The network must support self-configuration, self-management, and hot plug-and-play. It must require low-cost cabling and interfaces.

The HAVi software architecture is platform-independent and based on Java. HAVi uses the IEEE 1394 high-performance serial bus protocol for transport of control and content among the devices connected to the network. The IEEE 1394 standard is a dynamically configurable, low-cost digital network. IEEE 1394 defines both a backplane physical layer and a point-to-point cable-connected virtual bus implementations. The backplane version operates at 12.5, 25 or 50 Mbits/sec. The cable version supports data rates of 100, 200 and 400 Mbits/sec. The standard specifies the media, topology, and the protocol. The IEEE 1394 transport protocol is particularly useful for supporting audio and video communication protocols, due to its high data-rate capability.

The HAVi architecture controls the CE devices in the network through abstract representations of the CE devices. The abstract representations are operated upon by a controller and hide the idiosyncrasies of the associated real CE devices. The abstract representation thus provides a uniform interface for higher levels of software. The abstract representations are registered with their control properties reflecting those of the device represented. The abstract representations expose their Interoperability API's to the applications and collectively form a set of services for building portable, distributed applications on the home network.

The architecture allows a device to send a command or control information to another device in the home network. A HAVi-compliant device contains data (above abstract representation, referred to as Device Control Model or DCM, see further below) relating to its user-interface (e.g., GUI) and to its control capabilities. This data includes, for example, HAVi bytecode (Java) that can be uploaded and executed by other devices on the network. A HAVi-compliant device has, as a minimum, enough functionality to communicate with other devices in the system. During interaction, devices may exchange control and data in a peer-to-peer fashion. This ensures that at the communication level, none of the devices is required to act as the master or controller of the system. On the other hand, it allows a logical master or controller to impose a control structure on the basic peer-to-peer communication model. HAVi distinguishes between controllers and controlled devices as explained further below. A controller is a device that acts as a host for a controlled device. A controller hosts the abstract representation for the controlled device. The control interface is exposed via the API of the abstract representation. This API is the access point for applications to control the device.

HAVi-compliant CE devices are devices categorized as follows: Full-AV devices (FAV's), Intermediate-AV devices (IAV's) and Base-AV devices (BAV's).

An FAV contains a complete set of the software components of the HAVi-software architecture (see below). An FAV is characterized in that it has a runtime environment for HAVi bytecode. This enables an FAV to upload bytecode from other devices for, e.g., providing enhanced capabilities for their control. An FAV may be formed by, e.g., a HAVi-compliant Set Top box, a HAVi-compliant Digital TV receiver, and an home PC. For example, an intelligent TV receiver can be the HAVi controller of other devices connected on the network. The receiver gets the bytecode uploaded from another device for creating a UI for this device and for providing external control of this device. An icon presenting this device can be made to appear on the TV screen and user interaction with the icon may cause elements of the control program to actuate the represented device in a pre-specified manner.

An IAV does not provide a runtime environment for HAVi bytecode, but may provide native support for control of specific devices on the home network. An IAV comprises embedded software elements that provide an interface for controlling general functions of the specific devices. These software elements need not be HAVi bytecode and may be implemented as native applications on the IAV that use native interfaces to access other devices.

A BAV may provide uploadable HAVi bytecode but does not host any of the software elements of the HAVi architecture. A BAV is controllable through an FAV by means of the former's uploaded bytecode. A. BAV is controllable through an IAV via the native code. Communication between an FAV or IAV, on the one hand, and a BAV on the other hand requires that the HAVi bytecode be translated to and from the command protocol used by the BAV.

The main software elements included in the core specification of the HAVi architecture are the ones listed below. For a more detailed explanation of these elements, please see the HAVi spec., herein reincorporated by reference.

1) A 1394 Communications Media Manager (CMM)—acts as an interface between the other software elements and the IEEE1394.
2) An Event Manager (EM)—informs the various software elements of events in the network such as the changes in the network configuration that occur when appliances (devices) are added or removed from the network.
3) A Registry—maintains information about the appliances connected to the network and the functions they offer. Applications can obtain this information from the registry.
4) A Messaging System (MS)—serves as an API that facilitates communication between the software elements of the various appliances on the network. The messaging system provides the HAVi software elements with communication facilities. It is independent of the network and the transport layers. A messaging system is embedded in any FAV and IAV. The messaging system is in charge of allocating identifiers for the abstract representations at the FAV or IAV. These identifiers are first used by the abstract representations to register at the FAV or IAV. Then they are used by the abstract representations to identify each other within the home network. When a first abstract representation wants to send a message to another abstract representation it has to use the identifier of the latter while invoking the messaging API.
5) A Device Control Module (DCM)—represents an appliance on the network. Application programs can interact directly with a DCM. This shields them from the idiosyncrasies of each individual appliance.
6) A DCM Manager—Installs the DCMs. It automatically reacts to changes in the network by installing new DCMs for new appliances.

7) A Data Driven Interaction (DDI) Controller—renders a GUI (Graphical User Interface) on a appliance's display on behalf of a HAVi software element. It supports a wide range of displays, varying from graphical to text-only.

8) A Stream Manager (SMGR)—creates connections and routes real-time AV streams between two or more appliances on the network.

The HAVi architecture specifies at least two levels of interoperability, referred to as level 1 and level 2.

Level 1 interoperability addresses the general need to allow existing devices to communicate at a basic level of functionality. To achieve this, level 1 interoperability defines and uses a generic set of control messages (commands) that enable one device to communicate with another device, and a set of event messages that it should reasonably expect from a device given its class (TV, VCR, DVD player, etc). To support this approach a basic set of mechanisms is required: device discovery; communication, and a HAVi message set.

As to device discovery: each device in the home network needs a well-defined method that allows it to advertise its capabilities to others. The HAVi approach is to utilize so-called SDD data: self describing data. The SDD data is required on all devices in the network. SDD data contains information about the device which can be accessed by other devices. The SDD data contains, as a minimum, enough information to allow instantiation of a so-called embedded device control module (embedded DCM). An embedded DCM is a piece of code pre-installed on a controlling IAV or FAV in platform-dependent code and using native interfaces to access the IAV's or FAV's resources. As mentioned above, a DCM for a device is a software element that provides an interface for control of general functions of the device. Instantiation of an embedded DCM results in registration of the device's capabilities with a registry. The registry provides a directory service and enables any object on the network to locate another object on the network. Registering allows applications to infer the basic set of command messages that can be sent to a specific device on the network.

As to communication: once an application has determined the capabilities of a device, the application needs to be able to access those capabilities. This requires a general communication facility allowing applications to issue requests to devices. This service is provided by the HAVi messaging systems and DCMs. The application sends HAVi messages to DCMs, the DCMs then engage in proprietary communication with the devices.

As to HAVi message sets: in order to support level 1 interoperability a well-defined set of messages is required that must be supported by all devices of a particular known class (e.g., the class of TV receivers, the class of VCR's, the class of DVD players, etc.). This ensures that a device can work with existing devices, as well as with future devices, irrespective of the manufacturer.

These three basic requirements support a certain minimal level of interoperability. Since any device can query the capabilities of another via the registry, any device can determine the message set supported by another device. Since applications have access to the messaging system, any device can interact with any other device.

Level 1 interoperability ensures that devices can interoperate at a basic level of functionality. However, a more extended mechanism is needed to also allow a device to communicate to other devices with any additional functionality that is not present in the embedded DCM's on an FAV. For example, embedded DCM's may not support all features of existing products and are unlikely to support those totally new ones of future product categories. Level 2 interoperability provides this mechanism. To achieve this, the HAVi Architecture allows uploadable DCM's as an alternative to the embedded DCM's mentioned above. The uploaded DCM may replace an existing DCM on an FAV. An uploadable DCM may be provided by, any suitable source, but a likely technique is to place the uploadable DCM in the HAVi SDD data of the BAV device, and upload from the BAV to the FAV device when the BAV is connected to the home network. Because the HAVi Architecture is vendor-neutral, it is necessary that the uploaded DCM will work on a variety of FAV devices all with potentially different hardware architectures. To achieve this, uploaded DCMs are implemented in HAVi (Java) bytecode. The HAVi bytecode runtime environment on FAV devices supports the instantiation and execution of uploaded DCMs. Once created and running within a FAV device, the DCM communicates with the BAV devices in the same manner as described above.

The efficiency of level 2 interoperability becomes clear when one considers resources needed to access a specific device functionality. Level 2 allows a device to be controlled via an uploaded DCM that presents all the capabilities offered by the device, whereas to achieve similar functionality in level 1, this DCM would have to be embedded somewhere in the network. For example, when a new device is added to a network, level 1 requires that at least one other device comprises an embedded DCM compatible with the new device. In comparison, level 2 only requires that one device provide a runtime environment for the uploaded DCM obtained from the new device.

The concept of uploading and executing bytecode also provides the possibility for device-specific applications called Device Control Applications. Through these applications a device manufacturer can provide the user a way to control special features of a device without the need for standardizing all the features in HAVi. The application is provided by a DCM in HAVi bytecode and can be uploaded and installed by each FAV device on the network.

For further information, reference is made to the HAVi specification and the IEEE 1394 specification that are available in the public domain. The HAVi core specification has been made available on the web at, for example, http://www.sv.philips.com/news/press, and is incorporated herein by reference.

Now, within the HAVi-context, routes can be installed through registering for setting up messaging traffic upon state changes in a the devices making up a HAVi-compliant system. Again, by labeling the messages using identifiers, routes of different scenarios are kept independent in a similar manner as edscribed in the obkject-oriented approach discussed with reference to FIGS. 1 and 2. Within these different contexts, the terms calls and messages, objects and HAVi-software representations are to be interpreted as equivalent for the purpose of this invention.

The following U.S. patent applications are incorporated herein by reference:

U.S. Ser. No. 08/731,624 now U.S. Pat. No. 5,959,536 of same Assignee, filed Oct. 15, 1996 for Paul Chambers and Saurabh Srivastava for "TASK-DRIVEN DISTRIBUTED MULTIMEDIA CONSUMER SYSTEM". This document relates to a control system comprises multiple consumer electronics devices and task-driven control means coupled to the devices for controlling an interaction among the devices. The control means acts on respective software representations of each respective one of the consumer devices. By encapsulating the variable complexity of the task within a software representation, it can be made as simple or as sophisticated as needed to bring the capabilities up to a common level. Since the level of interface is common to the devices, applications can uniformly manipulate devices which embody very different levels of sophistication.

U.S. Ser. No. 09/146,020 now U.S. Pat. No. 6,199,139 of same Assignee filed Sep. 02, 1998 for Yevgenyi Shteyn for "LOW DATA-RATE NETWORK REPRESENTED ON HIGH DATA-RATE HAVi-NETWORK". This document relates to a PC-based home automation system that uses a low data-rate transport layer and COM-based software components for control of devices in a home automation network. The home automation system is merged with a messaging-based HAVi-network that uses IEEE 1394 as a high data-rate transport layer. The HAVi-network controls audio/video equipment in a home entertainment system. The home automation services and devices are registered as a HAVi-compliant elements with the HAVi network's FAV or IAV device. The home automation resources (devices and services) have both COM OLE Automation Interfaces and HAVI-compliant interfaces to permit control of the home automation system from the HAVi-network.

U.S. Ser. No. 09/107,525, filed Jun. 30, 1998 for Yevgenyi Shteyn and Gregory Gewickey for "DYNAMIC E-REGISTERING OF DEVICES IN SYSTEM WITH MULTIPLE COMMUNICATION PROTOCOLS. This document relates to an information processing system that has first and second electronic sub-systems, and control means for controlling the sub-systems. At least the first sub-system has a software representation registered with the control means. The control means changes a state of the first sub-system through interacting with the software representation. The first and second sub-system of the first interacting directly with one another without the control means being involved. To avoid conflicts, at least the first sub-system is capable of de-registering with the control means so as to functionally disable its software representation at the control means.

I claim:

1. An information processing system comprising:
a first physical component having at least a first property;
a second physical component having at least a second property;
a third physical component having at least a third property;
wherein:
the first property includes a plurality of routes,
at least one route of the plurality of routes being provided for altering the second property, and
at least one other route of the plurality of routes being provided for altering the third property, and
an instruction that alters the first property includes an identifier that selectively enables one or more routes of the plurality of routes to thereby enable altering the second property and the third property independently;
wherein
each of the first, second, and third physical components are each represented by corresponding first, second, and third software objects, and
changes to the first, second, and third properties are effected via software calls to the corresponding first, second, and third software objects.

2. The system of claim 1, wherein:
the instruction alters the first property before selectively enabling the one or more routes, and
the enabling is based on a match between the identifier and the one or more routes of the plurality of routes.

3. The system of claim 1, wherein
the identifier comprises a reference to a scenario of operating the system.

4. The system of claim 1, wherein
the system enables a software application to register at least one of the plurality of routes; and
the identifier comprises a reference to the software application.

5. The system of claim 4, wherein
the identifier comprises a reference to a scenario of operating the system.

6. The system of claim 1, wherein
the system enables a software application to register at least one of the plurality of routes; and
the at least one of the plurality of routes comprises a reference to the software application.

7. The system of claim 4, wherein
the at least one of the plurality of routes registered by the software application is de-registered after running the software application on the system.

8. A method of enabling to control an information processing system, wherein:
the system comprises:
a first physical component represented by a first software object;
a second physical component represented by a second software object;
the first object has at least a first property that is changed upon receipt of a first call to the first object;
the second object has at least a second property that is changeable through a second call to the second object; and
the method comprises:
enabling to register a property route linking the first property to the second property so that a change in the first property selectively enables to issue the second call to the second object if the route is invoked;
enabling the first object to receive the first call with an identifier for selectively invoking the property route;
enabling to determine a correspondence between the identifier and the property route; and
enabling to invoke the route only if the identifier corresponds to the property route,
so that upon receipt of the first call, the first property is changed, but the second call to the second object is not invoked if the identifier in the first call does not correspond to the property route.

9. The method of claim 8, wherein
the first property is changed prior to invoking the route.

10. A component comprising:
at least one property that includes a plurality of property routes,
each route of the plurality of property routes being associated with an other property at one or more other components for selectively altering the other property, and
a software module that is configured to alter the at least one property and select other properties upon receipt of an instruction that includes an identifier of one or more selected routes of the plurality of property routes,
wherein
upon receipt of the instruction, the component is configured to effect alteration of:
the at least one property, and
each property associated with the one or more selected routes, only.

11. The component of claim 10, wherein
the software module is configured as an object in an Object Oriented Programming embodiment.

* * * * *